A. R. Chase,
Paddle Wheel.

Nº 2,845.   Patented Nov. 9, 1842.

Inventor
A. Ralston Chase

UNITED STATES PATENT OFFICE.

A. RALSTON CHASE, OF CINCINNATI, OHIO.

IMPROVEMENT IN THE MANNER OF CAUSING THE BUCKETS OR PADDLES OF PADDLE-WHEELS TO ENTER AND LEAVE THE WATER IN ANY REQUIRED POSITION.

Specification forming part of Letters Patent No. 2,845, dated November 9, 1842.

*To all whom it may concern:*

Be it known that I, A. RALSTON CHASE, of Cincinnati, in the county of Hamilton and State of Ohio, have invented a new and useful Manner of Causing the Buckets of Vertical Paddle-Wheels to Enter and Leave the Water in a Vertical or in any other Required Position; and I do hereby declare that the following is a full and exact description thereof.

A great variety of mechanical devices have been adopted for the purpose of causing the buckets of paddle-wheels to retain such a relative position during the revolution of the wheels as shall cause their planes to be continuously parallel to each other, so that each of them may enter and leave the water in a vertical position or in any other which may be preferred. The arrangements hitherto made for this purpose have, however, been found defective, and that principally from a liability in the apparatus to get out of order. The manner of effecting this object which I have invented will, it is believed, obviate the above-named and other objections to wheels of this kind.

Figure 2:
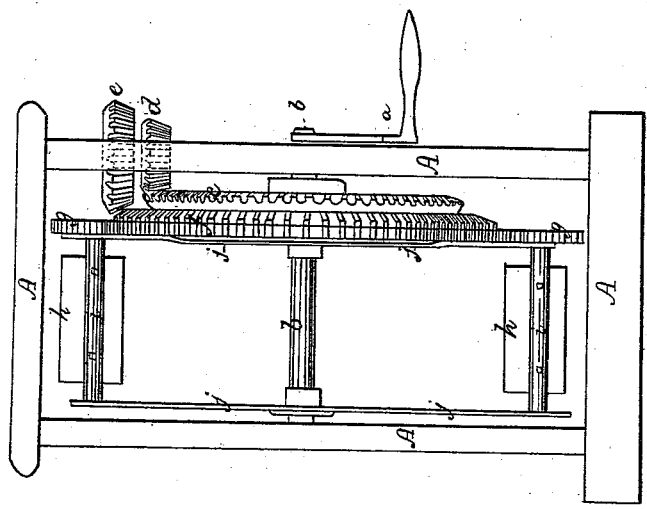
Figure 3:
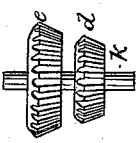
Figure 1:
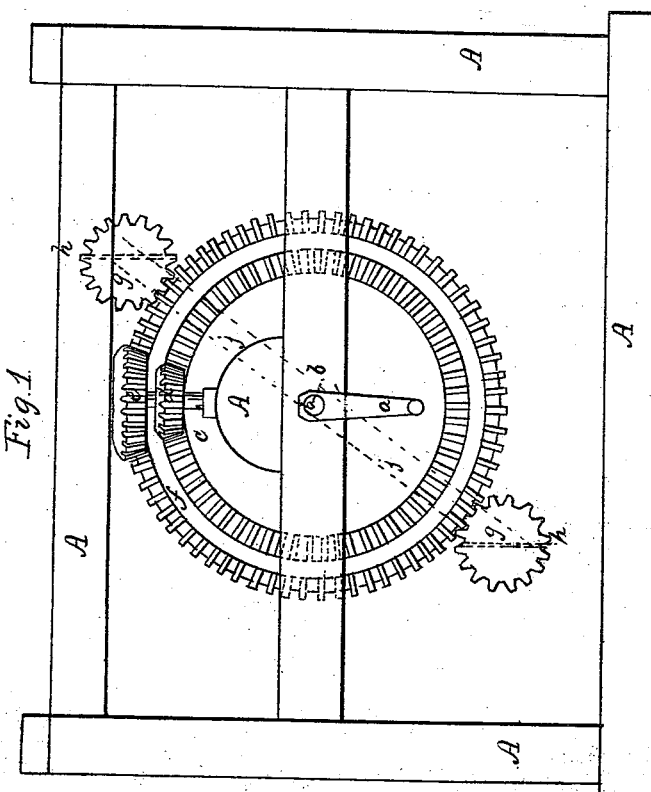

In the accompanying drawings, Figure 1 is a side view of the principal gearing by which the positions of the buckets are regulated. Fig. 2 is an edge view of the propelling-wheel, but showing only two of the buckets, the others being omitted for the purpose of rendering the explanation of their action the more clear. Fig. 3 is a separate representation of two bevel-pinions or small cog-wheels which make a part of the gearing and which are shown also in Figs. 1 and 2.

The main shaft $b$ of the paddle-wheel is supported and revolves in suitable boxes or bearings in the frame-work A A. The arms $j\ j$, Fig. 2, sustain the shafts $i\ i$ of the buckets $h\ h$, the shafts $i\ i$ being furnished with gudgeons, of which said arms constitute the bearings. Each of the shafts $i\ i$ has a pinion or small spur-wheel $g\ g$ firmly attached to one of its ends. These pinions gear into a large wheel $f\ f$, furnished with spur and bevel teeth. The wheel $f\ f$, which I call the "regulator," is received on the main shaft $b$, but it is not affixed to it, being left free to turn upon it, for a purpose to be presently described. The wheel $c$ is likewise received upon the main shaft $b$ and is firmly keyed to so as to revolve with it. The two pinions $d$ and $e$ are each affixed to the vertical axle $k$, which has its bearings in the frame-work, so as to gear, respectively, into the wheels $c$ and $f$, each of these wheels having bevel-teeth to adapt them to the above-named pinions, and the wheel $f$ having spur-teeth also on its periphery to gear into the pinions $g\ g$. The wheels $c$ and $f$ must be at that distance apart as shall correspond to the different diameters of the pinions $d$ and $e$.

By giving to the respective wheels and pinions, arranged and combined as above set forth, the proper relative diameters the buckets will, when motion is given to the main shaft $b$, be made to revolve with their planes continuously parallel to each other and forming the same angle with the horizon. The gearing-wheels must of course vary in size, according to the size of the propelling-wheel itself; but the following proportionate diameters will be found to produce the intended effect in accordance with the well-known rules for calculating the angular velocities of wheels gearing into each other. The diameter of the wheel $c$ may be represented by the number 4, of $f$ by the number 5, of $d$ and $g$ by the number 1, and of $e$ by $1\frac{1}{4}$.

Having thus fully described the manner in which I arrange and combine the respective wheels and pinions, in order to maintain the continued parallelism to each other of the planes of the buckets in a revolving paddle-wheel, it is to be distinctly understood that I do not claim to be the first who has applied a gearing of cog-wheels and pinions to regulate and determine the manner in which the buckets shall dip into and leave the water; but

What I do claim is—

The effecting of this object by the attaching of the wheel $c$ to the shaft of the paddle-wheel and the combining of the same with the regulating-wheel $f$ by means of the small wheels or pinions $d$ and $e$, the regulating-wheel being also made to drive the pinions on the shafts of the buckets, the whole apparatus being arranged and operating substantially as herein set forth.

A. RALSTON CHASE.

Witnesses:
THOS. P. JONES,
J. H. GODDARD.